(12) United States Patent
Schmidt

(10) Patent No.: US 8,931,630 B2
(45) Date of Patent: Jan. 13, 2015

(54) QUICK ACCESS ALLERGEN CLEANING OPEN FRAME CONVEYORS

(71) Applicant: Norman Schmidt, Burnaby (CA)

(72) Inventor: Norman Schmidt, Burnaby (CA)

( * ) Notice: Subject to any disclaimer, the term of this patent is extended or adjusted under 35 U.S.C. 154(b) by 0 days.

(21) Appl. No.: 13/726,004

(22) Filed: Dec. 21, 2012

(65) Prior Publication Data

US 2013/0161157 A1    Jun. 27, 2013

Related U.S. Application Data

(60) Provisional application No. 61/580,174, filed on Dec. 23, 2011.

(51) Int. Cl.
| | | |
|---|---|---|
| *B65G 15/62* | (2006.01) | |
| *B65G 15/60* | (2006.01) | |
| *B65G 15/08* | (2006.01) | |

(52) U.S. Cl.
CPC ............... *B65G 15/60* (2013.01); *B65G 15/08* (2013.01); *B65G 2812/02069* (2013.01); *B65G 15/62* (2013.01); *B65G 2207/26* (2013.01)
USPC ............................ 198/823; 198/841; 198/494

(58) Field of Classification Search
CPC ................. B65G 15/08; B65G 15/62; B65G 2812/02069
USPC ........................... 198/823, 841, 816, 494–499
See application file for complete search history.

(56) References Cited

U.S. PATENT DOCUMENTS

| | | | | |
|---|---|---|---|---|
| 3,556,286 | A * | 1/1971 | Naito et al. ................... | 198/823 |
| 4,067,318 | A * | 1/1978 | Flaith et al. ..................... | 34/208 |
| 4,789,056 | A * | 12/1988 | Bourbeau ...................... | 198/823 |
| 4,793,470 | A * | 12/1988 | Andersson ..................... | 198/823 |
| 4,932,516 | A * | 6/1990 | Andersson ..................... | 198/823 |
| 5,007,528 | A * | 4/1991 | Hideharu ....................... | 198/823 |
| 5,927,478 | A * | 7/1999 | Archer .......................... | 198/823 |
| 6,454,083 | B2 * | 9/2002 | Burkhart et al. .............. | 198/823 |
| 7,527,144 | B2 * | 5/2009 | Ostman ......................... | 198/823 |
| 7,815,040 | B2 * | 10/2010 | Kuiper et al. .................. | 198/823 |
| 2006/0096843 | A1 * | 5/2006 | Hosch et al. .................. | 198/841 |
| 2006/0249357 | A1 * | 11/2006 | Wilmo et al. ................. | 198/841 |
| 2007/0017786 | A1 * | 1/2007 | Hosch et al. .................. | 198/841 |

* cited by examiner

*Primary Examiner* — Mark A Deuble
(74) *Attorney, Agent, or Firm* — Tangent Law Group, PLLC; Eric J. Weierstall, esq.

(57) ABSTRACT

An open frame design of conveyors that will allow inspection access as well as sanitation access to all surfaces of conveyors that carry products that could contain Food Allergens, materials that could cause reactions as well as provide proper sanitation access. For proper and safe operation these allergens and offending materials must be removed and therefore proper access to all surfaces must be provided so as to be able clean and remove allergens and offending materials from all surfaces as well as to provide access to visually confirm proper removal has been carried.

10 Claims, 7 Drawing Sheets

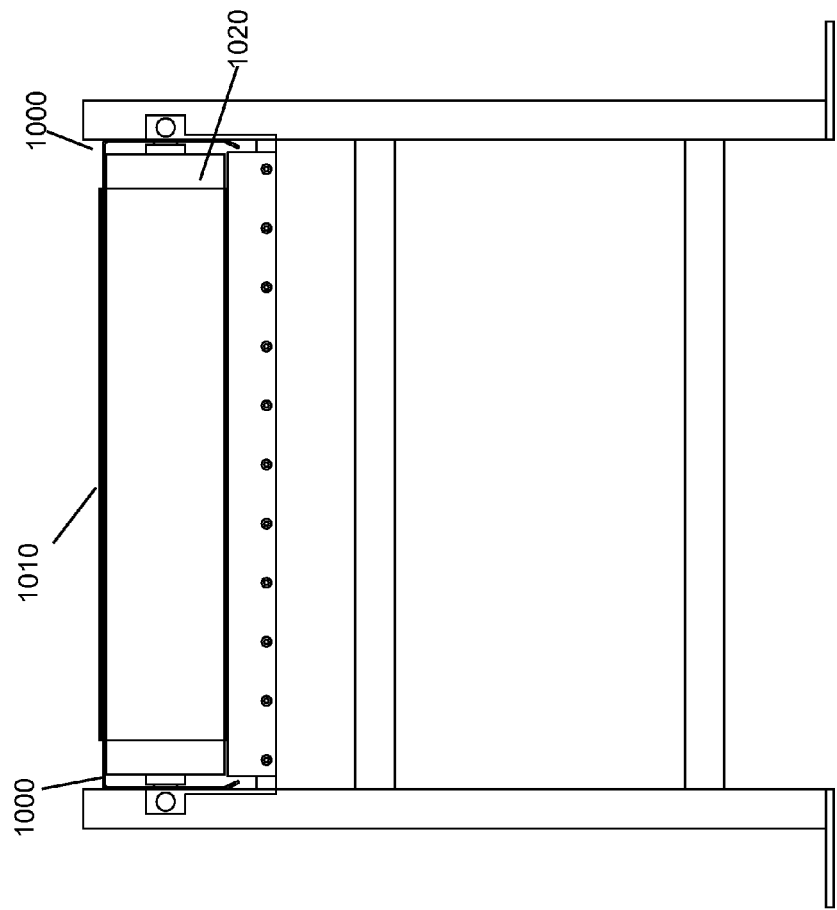

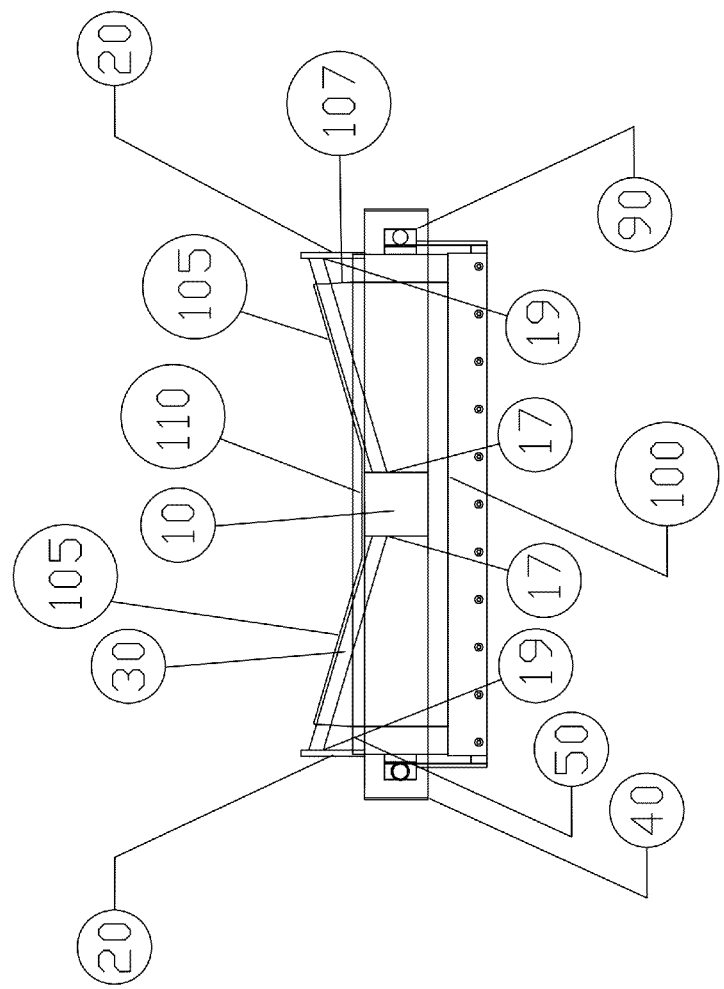

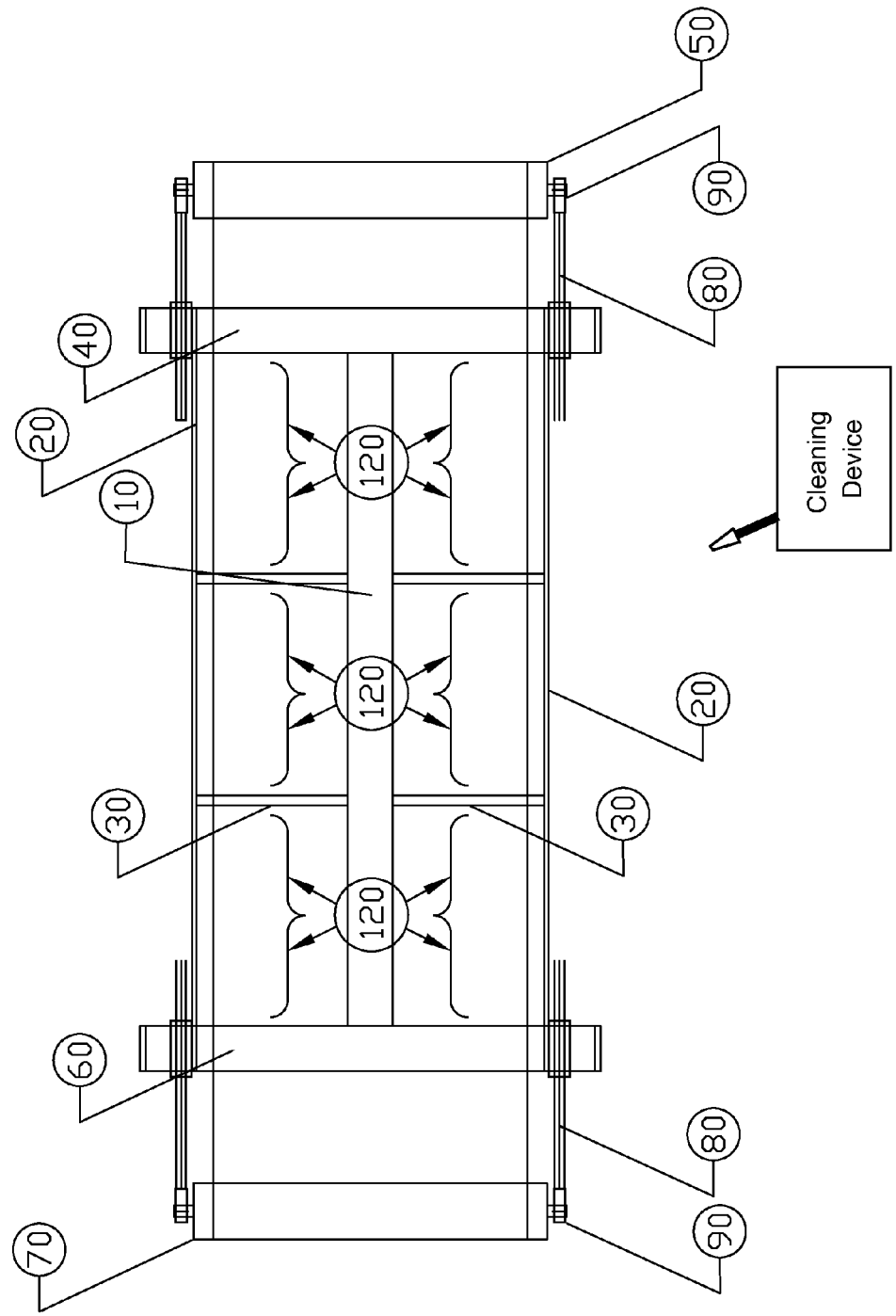

QUICK ACCESS ALLERGEN CLEANING OPEN FRAME CONVEYORS

CROSS-REFERENCE TO RELATED APPLICATIONS

This application claims the priority of U.S. provisional patent application 61/580,174, filed Dec. 23, 2011, which is incorporated herein by reference.

SUMMARY OF THE INVENTION

In the production of but not restricted to food and pharmaceuticals there exists materials that persons may have severe reactions to, such as but not limited allergic reactions or adverse drug interactions or the like. In food handling, these materials are typically a specific ingredient often referred to as allergens and are often related to nuts, seeds, sea food, herb, spices and the like. When persons have allergic reactions to these materials it can be a wide range of symptoms, ranging from but not limited to sweating, elevated heart rates, vomiting, respiratory issues and reactions that can approach or cause death.

Similarly, serious reactions can be encountered in the field of pharmaceutical manufacture where one type of pill or medication includes material that can greatly benefit a person with needs for this type of medication or drug, but which can cause adverse conditions to death in other persons that can not tolerate such materials or have a high sensitivity to such materials or have a counter indicative drug.

Additionally, there are non-allergen materials, such as bacteria, that may be undesirable in product handling, for instance in food processing. Though technically not allergens there exists a need to cleanse these contaminants as well for health and safety. For example, in the case of meat processing, there is a need to provide a better mechanism of ensuring complete sanitation access and thereby complete sanitization of conveyors.

For these reasons society and industry place a high need for the complete removal of all materials that are made or transported in a production run or having been in contact with processing and transport machinery. To accomplish this complete removal it requires that all devices be cleaned and/or disinfected, this cleaning process can typically be but is certainly not limited to thorough mechanical washing. The cleaning process must be able to remove all materials that were processed or were in contact with any machines or processing devices that could have come in contact with these materials. To accomplish this task the cleaning process must be able to access all surfaces of the device or process machinery. To access all surfaces the device must be either disassembled so that all surfaces can be accessed and cleaned or in the case of simpler devices the devices can or should be designed so that surfaces can be accessed for proper removal of materials.

The instant invention relates to transport devices typically referred to as conveyors which are used in the transport of materials that can create these reactions, such as but not limited to use with products such as and including allergens or pharmaceuticals or similar products with contaminant or allergen issues.

With conveyors there exists a need to provide an ability for the conveyor to be washed down in an effective manner so as to minimize the time and materials costs due to the cleaning and the down time in manufacturing and yet be able to clean all of the surfaces of the conveyor so as to provide complete and confirmable cleaning of the conveyors. To provide cleanability of these conveyors either the conveyor must be dis-assembled or it must be built in such a way that the conveyor can properly carry out its intended operation but also be as simple and straight forward so that it not require any disassembly for the purpose of complete cleaning. An example of the issues commonly faced in production can be seen in the prior art device shown in Table A. As seen in the table, the result of transport can often include distribution of allergens throughout the conveyor system, making it absolutely necessary to disassemble and clean between production runs.

Typical prior art devices could have latch mechanisms that would allow for the conveyor belt to be removed and by thus be able to significantly or completely expose all of the surfaces of the conveyor structure so that these surfaces could be cleaned. When the conveyor belt is removed the belt could also be washed and then replaced back onto the conveyor. This opening or latching system works well in certain applications, typically for smaller or shorter conveyors where the belts are shorter and one or two persons can remove and replace the belt. Problems arise when the conveyor is a longer conveyor, for instance a non-limiting example of a longer conveyor would be one of 30 to 50 feet long with resulting belts that can be 60 to 100 feet in length or more.

It is often difficult with these longer belts to handle the belt in a way that it can be replaced back on the conveyor without the product handling surfaces of the belt touching the floor which is typically but not always considered as being contaminated or other unacceptable surfaces that it may come in contact with. The long belts are also unwieldy and require labor intensive cleaning operations be carried out by large maintenance staff, which is costly. Additionally, being unwieldy, the whole process takes longer which means more down time for a production line, which impacts overall efficiency and bottom line cost.

In this long or difficult application it would be preferred to have the conveyor with belt designed so that all surfaces can be cleaned in place where full access to all of the surfaces is present. A need exists for a conveyor that allows for quick, complete access to the conveyors components for easier sanitation processes which improve the efficiency of cleaning allergens and other undesirable elements from the conveyor components while doing so without major disassembly of the components and time consuming movement of unwieldy components in the cleaning process so as to improve the efficiency of cleaning and thereby increase the turnaround and up time of the conveyor. The instant of invention provides such a conveyor device, one that can be cleaned in all critical areas of contact without the need for disassembly of the conveyor or removal of the moving transport surface component commonly referred to as the conveyor belt.

Moreover, the above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

BRIEF DESCRIPTION OF THE INVENTION

The instant invention comprises an apparatus, a system, a method of cleaning the system, and a method of operating the apparatus.

An aspect of the invention is to provide a fabrication used in the transport of typically but not restricted to loose materials, typically but not restricted to materials that may contain allergens as with food products that may contain a host of allergens such as nuts, gluten materials, dairy products, seeds or specific materials such as pharmaceuticals where cleaning can be easily accomplished so that one person's beneficial medications or food processing can avoid producing deeply detrimental results to other persons.

A further aspect of the invention is to provide conveyors which meet or exceed conventional conveying standards in strength, rigidity, product conveyance and reliability Yet another aspect is to provide conveyors that let the sanitary condition be viewed directly or instantaneously without the need for disassembly to gain access to inspect and confirm.

A still further aspect is to provide conveyors that are sufficiently open in structure and design so that they can be viewed for confirmation of proper and complete cleaning of and removal of all offending materials.

Another aspect of the invention is to provide an at least one conveyor belt which is typically comprised of but not limited to a core material of woven fiber materials with a material handling layer or top layer of a flexible material typically but not limited to Poly Urethane, Poly-Vinyl Chloride or the like.

Further aspects of the invention include providing a conveyor frame with support structure to hold up conveyance belt plus the product placed on the conveyor belt and allow for easy access to all surfaces to allow for cleaning and removal of any materials that could cause adverse reactions of materials with humans.

Yet a still further aspect is to provide a construction having a central structural element with raised sides and providing a greater resistance to flexing in the longitudinal and lateral directions.

The apparatus of the invention includes a conveyor belt system having an at least one central longitudinal member with an at least one side longitudinal member substantially parallel to the at least one central longitudinal member. An at least two support members are spaced apart from one another and between the at least one side longitudinal member and at least one central longitudinal member. An at least one drive end frame member mounting an at least one drive pulley coupled to an at least one drive is also provided. An at least one idler end frame member mounting an at least one idler pulley is also provided. An at least one conveyor belt is coupled to the drive through the at least one drive pulley and mounted on the at least one idler pulley, such that the at least one central longitudinal member is coupled to the at least one side member through the at least two support members spaced therebetween and the at least one side longitudinal member is elevated relative to the at least one central longitudinal member and the at least two support members are angled downwardly from the at least one side longitudinal support member to the at least one central support member.

The conveyor belt system can further include a transport surface, two side surfaces, and a non-transport surface of the at least one conveyor belt and wherein the at least two support members are substantially perpendicular to the central longitudinal member. The transport surface of the conveyor belt can provide a curved profile formed by the coupling of the at least one central longitudinal member with the parallel at least one side longitudinal member and the at least two perpendicular support members to form a trough in the conveyor belt.

The at least one central longitudinal member is a single central longitudinal member and the parallel at least one side longitudinal member can be comprised of two longitudinal members equally spaced on either side of the single central longitudinal member. The support members can be substantially perpendicular to the single central longitudinal member and extend therefrom to join with the at least one side member at an upward angle relative to the central longitudinal member.

The coupling of the at least one central longitudinal member with the at least one side longitudinal member through the at least two perpendicular support members can be spaced such that the conveyor belt is seperatable from the structure without the need for disassembly of the structure and can permit access through the at least one longitudinal side member to the at least one central longitudinal member, the at least one side longitudinal member, the at least two perpendicular support members and the belt through an open side construction adapted to permit access to a cleaning device cleaning the conveyor belt system and further inspection of the cleaning of the conveyor belt system by the cleaning device.

The elevated at least one side member can be coupled to the at least one central member through the at least two perpendicular support members resulting in an increased resistance to a bending movement on the conveyor as measured from an end of the conveyor such that the at least one side member coupled to the at least one central member through the at least two perpendicular support members provides improved rigidity over the length of the conveyor.

The elevated at least one side member can be coupled to the at least one central member through the at least two perpendicular support members resulting in an increased resistance to a bending movement on the conveyor as measured from a first side to a second side of the conveyor such that the at least one side member coupled to the at least one central member through the at least two perpendicular support members provides improved rigidity over the width of the conveyor. The conveyor system can further include an adjustment rod adjusting the tension of the conveyor belt.

The invention also includes a method of operating a conveyor belt system by applying a conveyor belt to conveyor belt system having an at least one central longitudinal member, an at least one side longitudinal member, each having open side construction adapted to permit access to a cleaning device and an at least two support members coupling the at least one central longitudinal member to the at least one longitudinal side member such that the at least one central longitudinal member is below the at least one side member; engaging a drive pulley to move conveyor belt and convey product; disengaging drive; and cleaning without removing the conveyor belt such that the at least one central longitudinal member and the at least one side longitudinal member, each having open side construction adapted to permit access to the cleaning device, permits deployment of the cleaning device with access to substantially all surfaces of the system without removal of the conveyor belt from the conveyor belt system.

Moreover, the above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

Embodiments of the invention are explained in greater detail by way of the drawings, where the same reference numerals refer to the same features.

FIGS. 1, 1A and 1B show a prior art conveyor.

FIG. 3 shows an end view of an exemplary embodiment of the instant of invention.

FIG. 4 shows a top view of an exemplary embodiment of the instant of the invention.

DETAILED DESCRIPTION OF THE INVENTION

In constructing the invention, an improved conveyance or conveyor system is described which utilizes several typical components but having the conveyor frame or structure with several unique facets or features so as to operate properly or in accordance with requirements for complete access and wash down capabilities without substantial disassembly being required, so as to be able to remove allergens and residual materials that could pose hazards efficiently, quickly, thoroughly and in a cost effective manner and to provide for additional rigidity and structural integrity, as further explained herein below. To accomplish this, the frame must be strong enough to meet design requirements and all the surfaces of the conveyor frame and belt must be accessible for cleaning and for visual confirmation that the surfaces have been cleaned.

Figure 1:
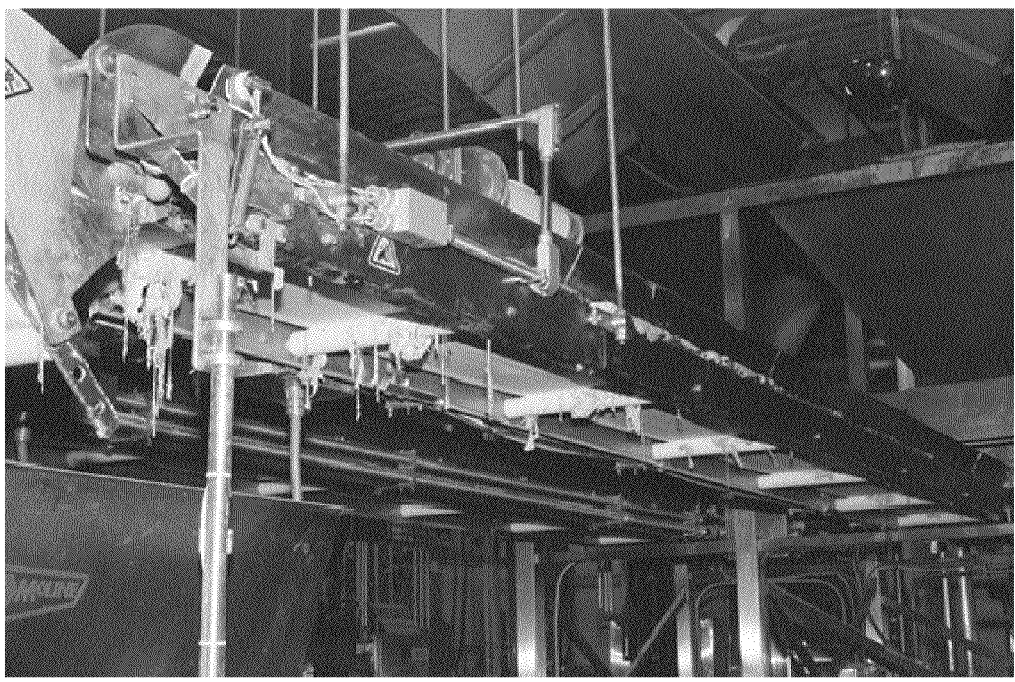
Figure 1A:
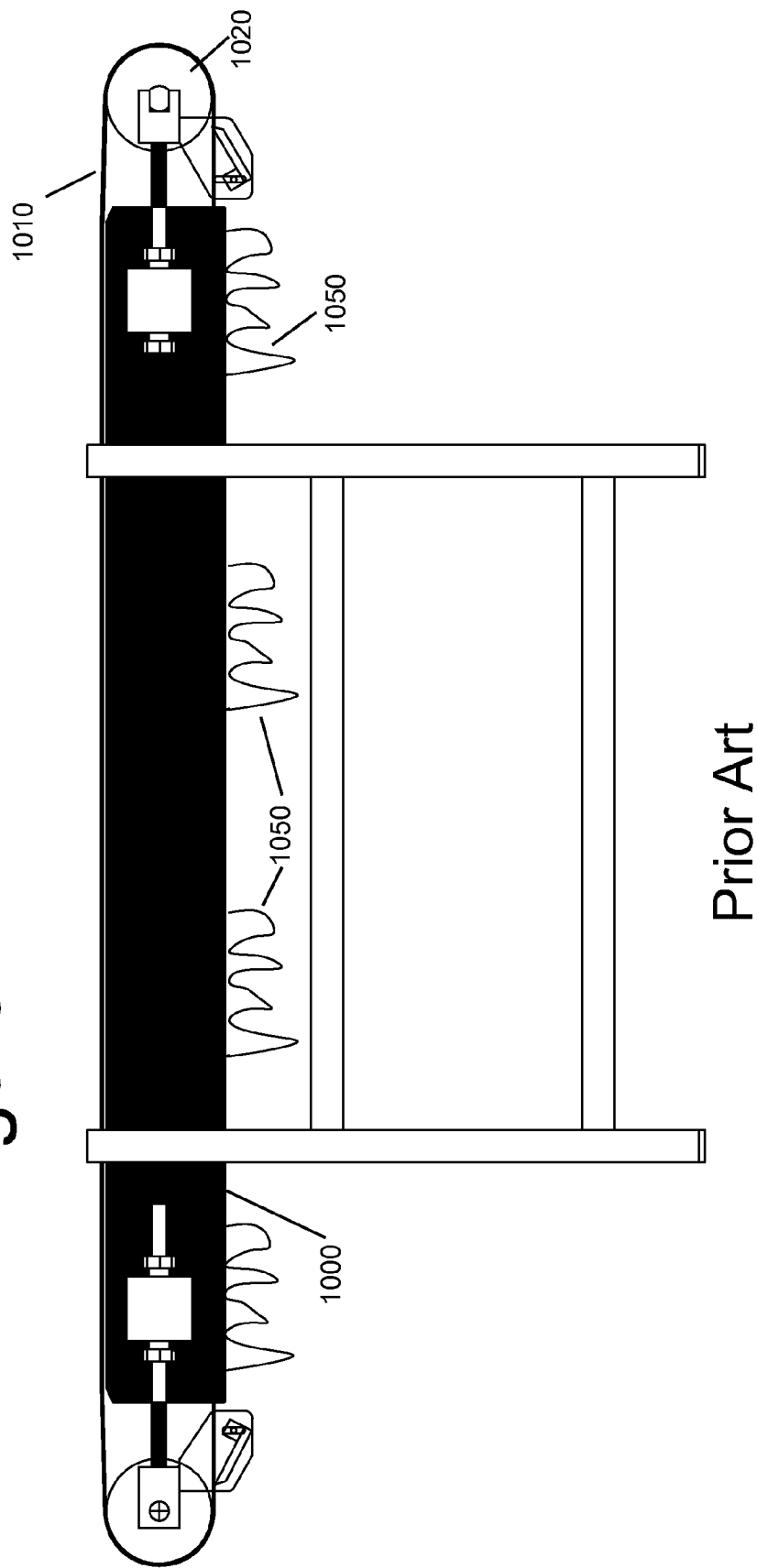

FIGS. 1A and 1B show a typical prior art conveyor belt. Generally, the device is constructed of a closed box beam or support beam 1000 on each side of the conveyor belt 1010 with the conveyor belt stretched between these supports and end rollers 1020. The conveyor belt conveys materials. As noted above, these can contain allergens and often get deposited within the conveyor system, including in and around the belt 1010 and between the structural elements, like the support beams 1000. The construction and limited accessibility to the conveyor elements and renders it difficult and inefficient to clean the allergens from the conveyor device. This is exemplified in the previously presented table, where the inefficiency is clearly shown as well as the issue with byproducts 1050 from the transport on the conveyor belt 1010. These are generally inadequate in providing access for cleaning, as typified by the type of operations and resulting state of uncleanliness shown in this figure and Table 1.

Figure 2:
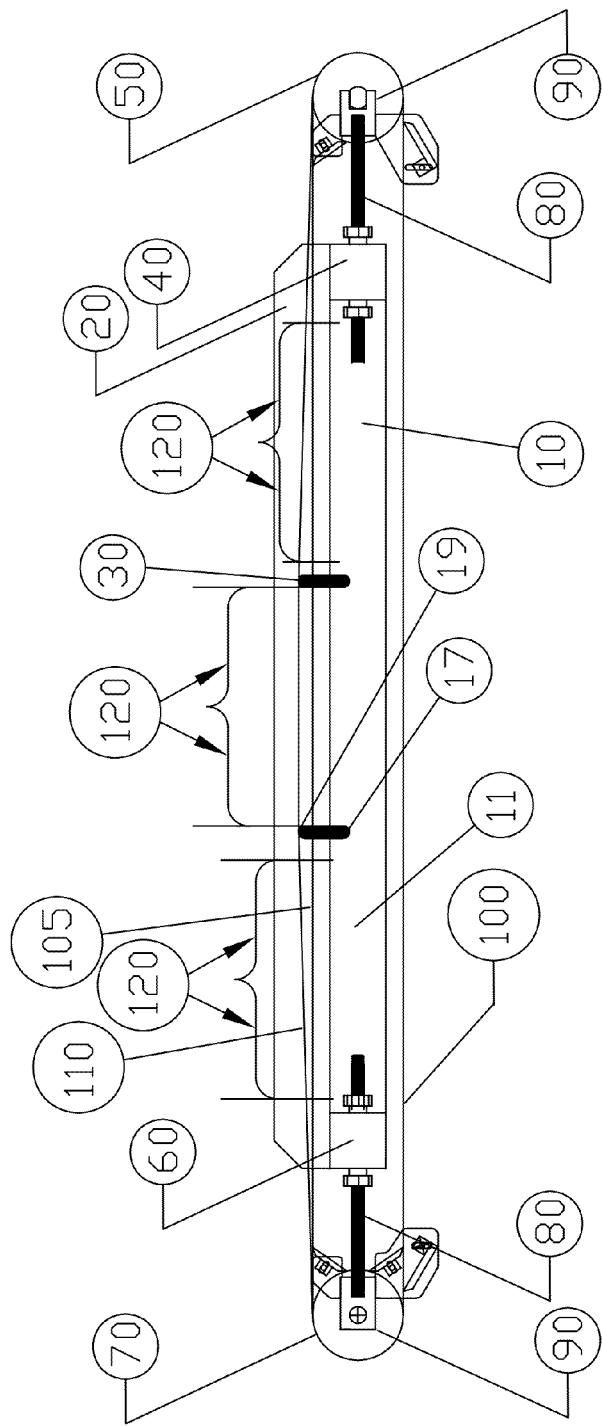
FIG. 2 shows a side view of an exemplary embodiment of the instant invention.

FIG. 2 shows a side view of an exemplary embodiment of the instant invention. As seen in FIGS. 2-4, the exemplary embodiment of the instant of invention provides that the frame of the conveyor is made so as to be a series of longitudinal members 10, 20 as well as cross members 30 sized and so arranged so as to provide a structure of sufficient strength for the conveyor system 1 to meet operation requirements as well as provide for extra strength and safety to accept loading beyond operational requirements that can occur while remaining open for ease of access in a cleaning operation.

As seen in FIG. 2, the conveyor system 1 includes the at least one central longitudinal member(s) 10 with the at least one side longitudinal members or frame members 20, here shown as two. The at least one perpendicular support members or rods 30, here three, are shown as well. With an at least one drive end frame member 40 which holds the drive pulley 50 and an at least one idler end frame member 60 which holds the at least one idler pulley 70, and adjuster rods 80 and pulley mount blocks 90 which are used to mount both the drive as well as the idler pulleys 50, 70 and the conveyor belt 100.

As noted the invention uses an at least one idler or take up pulley(s) 70 which are typically but not limited to pulleys which are of similar design and width as the drive pulley but do not or are not driven by any type of drive system such as is the case of a drive pulley. Idlers are typically allowed to rotate about an axis perpendicular to the travel direction of the belt thru the use of a bearing device that allows the pulley easy rotation about its axis. These idler pulleys may also be rollers or similar devices that may lie below the belt, either below the product carrying side 112 or below the entirety of the conveyor belt 100.

Additionally, reference is made to an at least one drive motor which in this case is contained within the confines of the drive pulley 50 as shown, which can be employed with gear reduction components (not shown) that can reduce or increase the speed of the conveyor 100 to a desired speed to that which is required for the transport of the materials by the drive pulley 50. Alternatively an external motor and drive mechanism (not shown) can be utilized to drive the pulley 50 to similar effect. This engages the at least one drive pulley(s) 50 that use the rotational output of the motor and gear drive to produce linear motion of the conveyor belt or a motorized pulley where the pulley will contain the drive motor with required reduction gear sets to provide the correct or desired final conveyance speed may also be the prime mover of such a pulley.

Figure 3B:
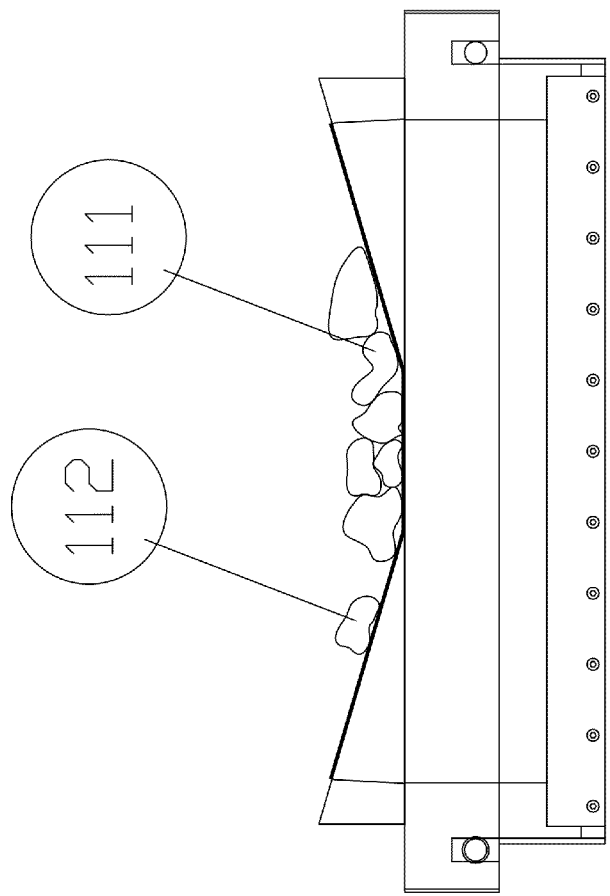
FIG. 3B shows an end view of an exemplary embodiment of the instant of invention carrying material.

In the exemplary embodiment shown in the drawing the at least one side longitudinal member or frame members 20 are above the at least one central longitudinal member(s) 10 with at least one support members or rods 30 as best seen in the end view of FIGS. 3 and 3B. The support rods 30 are inclined bars in this instance, though they may also be square or flat structural members or the like, that run from the center support member or conveyor spine 10 to the at least one longitudinal frame members or outer rails 20 at an upper coupling or mounting point 19. The support rods 30 are also coupled to the at least one central longitudinal member(s) 10 at the illustrated lower mount point 17. This vertical height difference or separation distance between the at least one side longitudinal member 20 and the central longitudinal member 10 provides added rigidity to the conveyor about an axis in the center area of the conveyor frame and coming out of the page as discussed above, due to the contour imparted therein. As shown in the exemplary embodiment, the support members 30 are shown as perpendicular to the central longitudinal member 10 and the at least one side longitudinal member 20. In further embodiments, these support members 30 may be angled relative to the longitudinal members.

Additionally, the non-material carrying or non-product handling side of the conveyor belt 100 can be for example, but is not limited to, an exposed woven fiber material(s) with or without an impregnation to seal the product handling or material carrying surface of the conveyor belt 100. The non-product carrying side or surface 1 of the conveyor belt 100 could also have a coating, which can be but is not limited to Poly Urethane, Poly-Vinyl Chloride and similar coatings. This added layer being typically but not limited to being used for the purpose of sealing the non-product carrying side 115 of the conveyor belt 100.0

FIGS. 3 and 3B show an end view of an exemplary embodiment of the instant of invention. As best seen in FIGS. 3 and 3B, the longitudinal members 10, 20 are arranged so as to provide a suitable upper or material conveyor surface 105 with a shape or contour for the conveyor belt 100, as best seen in FIG. 3B, so as to properly contain the materials 111, 112 to be transported. Such contours are typically referred to as "troughing" in the industry which provides a cup-like shape so that the belt 100 will take on this shape due to the sides 107 of the belt 100 being higher that the center section 110 of the belt through contact with the cross members 30. This cupping or troughing effect or shape that the belt 100 profile or contour has ensures that materials 112, 111 that are on the belt 100 will, thru the movement of the belt 100, possibly in conjunction with added vibration or from the resulting vibration of movement and passage of the belt plus the effect of gravity, will tend to move the products or materials 111, 112 being transported towards the lowest or center section or portion 110 of the belt 100.

In some instances, the troughing of the belt 100 can be utilized to collect multiple units for transfer, again as seen in the units represented by units of materials 111, 112 being collected in FIG. 3B. Examples of production uses for this would be but certainly are not limited to pharmaceuticals, fresh whole fish, frozen or parts of processed fish, and other food processing and the like. In other instances, such as that of viscous materials which can include but are certainly not limited to soft food products such a sauces, slurries, dough and the like, these materials may be both viscous and or sticky enough to significantly remain on the belt where it was placed or where it contacted the belt when it was transferred to the belt 100. With these materials they may or may not tend to move or flow the center of the belt 100 but the profile or troughing of the belt 100 will ensure that the products will not tend to move further laterally to the outer edges of the belt. For this reason the troughing or contour is beneficial.

To provide for this troughing this exemplary embodiment of the instant invention uses longitudinal members 10, 20, which are placed with mirror images of cross-members 30 perpendicular to the longitudinal axis of the device and at an angle of inclination which is lower in the center and higher at where the outer edges of the conveyor belt 100 would run or be supported by the indicated cross-members. All of these members 10, 20, 30 being either longitudinal or perpendicular would be arranged so as to always provide for significant open area for cleaning, allergen removal and/or inspection.

The combination of an at least one center longitudinal member(s) 10 coupled to an at least one parallel outer or side member(s) 20 with perpendicular cross members 30 and perpendicular conveyor ends 50, 70 also has another desired aspect as it produces a very rigid configuration. With the added feature of the at least one center member 10 being lower than the at least one parallel side members 20 it greatly increases what is referred to as the inertia or bending inertia of an object so that it becomes rigid because of the depth of the body of the conveyor in that it becomes like a truss in configuration. That is the ridgidty is increased in that it uses the depth or distance of separation between upper and lower as well as outer to outer structural members to generate the inertia that gives it rigidity and strength.

Besides providing for increased inertia to give the conveyor longitudinal bending rigidity, by using it with the perpendicular members it also prevents the whole structure from just slipping or deflecting laterally in compression when tightening the conveyor belt toward its limits. For an example, in the case of a conveyor with only outer frame members with perpendicular members joining the two or more outer members with the perpendicular members being either straight or flat across or on curved shape to allow for contouring or profile of the conveyor belt, this design would allow for flexing in the shapes of an "S" or curve like a banana when it has this lesser degree of rigidity. Thus the combination of the members 10, 20, 30 in the exemplary embodiment yield additional desirable effects.

The increase in rigidity being valuable when building conveyors that are wider. Wider conveyors can range for example, but certainly not limited to, about 0.5 to about 1 meter wide or wider conveyor belts. This is especially problematic in these wider conveyors, but can be problematic in any conveyors, for instance when tensioning the belts if the spine or longitudinal structure of the conveyor starts to deflect laterally then the conveyor belt will miss-track and run off the side of the pulley and possibly become damaged if there is inadequate frame support. Any attempts to correct this non centered conveyor path track by tightening on one side of the pulley will just result in increased lateral deflection of the conveyor spine and increase the problem rather than correct the problem. This situation or phenomenon also increases in likelihood and severity with the increase in length of the conveyor. As an example if the conveyor is only a meter long then it can be reasonably rigid but if the conveyor tends to be longer such as but not limited to 10 to 20 meters then it will be more prone or will deflect more easily when using the same sizes of structural members.

For the above reasons the instant of the invention has desirable aspects both in the ability to be easily and readily accessed for cleaning and removal of all allergens as well as providing sufficient if not superior structural rigidity as compared to conventional or prior art conveyor technologies.

As seen in FIGS. 2 and 4, one can see an at least one center spine or central longitudinal member(s) 10, the at least one side longitudinal members or frame members 20 being substantially parallel thereto, the at least one perpendicular support members or rods 30 being substantially perpendicular to the longitudinal members, the at least one drive end frame member 40, the at least one drive pulley 50, the at least one idler end frame member 60, the at least one idler pulley 70, the at least one adjusting rod 80, the at least one pulley mount block 90 and conveyor belt 100—are also shown. From the view shown in this figure one can also see that the combination of all of the numbered constituents coupled together will also form a rigid structure that will greatly resist bending as previously indicated and shown from the side view and is easily accessible throughout the structure for cleaning by providing large gaps 120 within the frame structure and provides access to the troughed contour 105 on the product carrying side 112 of the conveyor belt 100 as well as to the angled contour of the non-product side 115 of the conveyor belt 100.

The at least one support members or rods or cross member 30 in this view are shown perpendicular to the longitudinal members but also are able to illustrate how they support the belt at support contact locations 17, 19. It should also be understood the angle relative to the longitudinal members, both central and side, may be varied. One skilled in the art will also recognize that these perpendicular support rods and the spacing provided will also, to a small degree, allow the belt to sag in the area 120 between the perpendicular support members or support rods 30, so that in the movement of the conveyor belt 100 along the longitudinal axis of the conveyor system the conveyor belt 100 will have a rising and falling or seemingly undulating effect.

The rising of the belt 100 will occur as the conveyor belt 100 approaches and goes atop at least one perpendicular support members or rods 30 and then goes to a sagging affect as the conveyor belt 100 goes from the supported area atop the support rod 30 to the center of the non-supported area 120. The resulting undulation has a beneficial purpose thru this movement action is allows or can contribute to the movement of the materials to be conveyed to migrate down with the aid of gravity to the center or lower center are of the troughed belt area 120. The contour or troughing also aids in guiding and containing product during transport.

FIG. 4 shows a top view of the instant of the invention. The top view shows the conveyor system, with the at least one central longitudinal member(s) 10, running the longitudinal axis of the conveyor system. As previously stated this at least one central longitudinal member(s) or at least one center spine 10 is shown in this exemplary embodiment as a single, wider structural member which is one non-limiting example of the number, shape and size of the member. There are also to either side of this at least one central longitudinal member(s) 10, the at least one side longitudinal members or outer longitudinal members or side frames 20 in the exemplary embodiment. These are shown as in the exemplary embodiment, but are certainly not limited to being, two longitudinal side members 20, one to either side. As a non-limiting exemplary embodiment it is understood that additional members can be provided without departing from the nature of the invention. For instance, in one non-limiting instance there could be an at least one outer longitudinal member as well as an at least one interstitial members without departing from the instant of invention.

Thus, the exemplary embodiment of the invention provides a device used in the transport of materials where the cleaning thereof is most important or critical so as to provide proper sanitation as well as complete washing for the purpose of removal of all materials that could pose health or medical problems. To provide for this the exemplary embodiment of the instant invention has a structure that will allow for reduced surface area for contamination as well as complete access to substantially all surfaces so as to allow for cleaning as well as inspection/confirmation of cleaning This access can be provided when the conveyor is stopped and a person can access the conveyor and lift the belt so as to deflect and provide clearance of the conveyor belt relative to the perpendicular support rods, although due to the nature and shape of the perpendicular support rods it is or would be highly unlikely that materials would collect at this location, and cleaning can be completed of the entire structure without the need for disassembly.

In addition, since the perpendicular support rods in the exemplary embodiment shown all terminate from a fixed elevation on the center spine and terminate on the other end at a higher elevation on the outer frame members it can be seen that the over all effect is that the belt is substantially lifted by this support structure that is higher on the sides than in the middle section of the belt will tend to sag or deflect downward at the middle to form this previously mention cupped or contoured shape. This cupped shape being the result in part of side uplifting effect of the perpendicular support members that are set at inclines that emanate upwards as one goes from the center spine outward towards where they are attached to the outer frame members. This condition of the belt dropping down in the center of the belt can be easily overcome during cleaning operations by putting a slight lifting force on the underside of the belt so as to overcome the drop down and thereby lift the center area of the belt off of lower center spine and provide access for cleaning of or for inspection that removal of all materials has been completed. During operations, the combination of the center spine and side frames provides for longitudinal support as well as rigidity from flexing laterally on a horizontal plane when the conveyor is operating or sitting on a horizontal axis and of course the rigidity would also be maintained in any plane that would match longitudinal axis in which the conveyor is positioned.

It should be noted that the members shown as 10 center spine, 20 side frames, perpendicular support rods 30, drive end frame member 40 and idler end frame member 60 may be changed in size and shape and number without departing from the intent or moment of invention of the device.

The embodiments and examples discussed herein are non-limiting examples. The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A conveyor belt system comprising:
an at least one conveyor belt having a length;
an at least one central longitudinal member;
an at least one side longitudinal member substantially parallel to the at least one central longitudinal member;
an at least two support members spaced apart from one another along the entire length of the conveyor belt and in direct contact and supporting the conveyor belt and between the at least one side longitudinal member and at least one central longitudinal member;
an at least one drive end frame member mounting an at least one drive pulley coupled to an at least one drive;
an at least one idler end frame member mounting an at least one idler pulley,
wherein the at least one conveyor belt is coupled to the drive through the at least one drive pulley and mounted on the at least one idler pulley, wherein the at least one central longitudinal member is coupled to the at least one side member through the at least two support members spaced therebetween and the at least one side longitudinal member is elevated relative to the at least one central longitudinal member and the at least two support members are angled downwardly from the at least one side longitudinal support member to the at least one central support member.

2. The conveyor belt system of claim 1, further comprising a transport surface, two side surfaces, and a non-transport surface of the at least one conveyor belt and wherein the at least two support members are substantially perpendicular to the central longitudinal member.

3. The conveyor belt system of claim 2, wherein the transport surface of the conveyor belt is provided with a curved profile formed by the coupling of the at least one central longitudinal member with the parallel at least one side longitudinal member and the at least two perpendicular support members to form a trough in the conveyor belt.

4. The conveyor belt system of claim 3, wherein the at least one central longitudinal member is a single central longitudinal member and the parallel at least one side longitudinal member are two longitudinal members equally spaced on either side of the single central longitudinal member.

5. The conveyor belt system of claim 4, wherein the substantially perpendicular support members relative to the single central longitudinal member extend therefrom to join with the at least one side member at an upward angle relative to the central longitudinal member.

6. The conveyor belt system of claim 2, wherein the coupling of the at least one central longitudinal member with the at least one side longitudinal member through the at least two perpendicular support members is spaced such that the conveyor belt is seperatable from the structure without the need for disassembly of the structure and permits access through the at least one longitudinal side member to the at least one central longitudinal member, the at least one side longitudinal member, the at least two perpendicular support members and the belt through an open side construction adapted to permit access to a cleaning device cleaning the conveyor belt system and further inspection of the cleaning of the conveyor belt system by the cleaning device.

7. The conveyor belt system of claim 2, wherein the elevated at least one side member is coupled to the at least one central member through the at least two perpendicular support members resulting in an increased resistance to a bending movement on the conveyor as measured from an end of the conveyor such that the at least one side member coupled to the at least one central member through the at least two perpendicular support members provides improved rigidity over the length of the conveyor.

8. The conveyor belt system of claim 2, wherein the elevated at least one side member is coupled to the at least one central member through the at leas two perpendicular support members resulting in an increased resistance to a bending movement on the conveyor as measured from a first side to a second side of the conveyor such that the at least one side member coupled to the at least one central member through the at least two perpendicular support members provides improved rigidity over the width of the conveyor.

9. The conveyor system of claim 1, further comprising an adjustment rod adjusting the tension of the conveyor belt.

10. A method of operating a conveyor belt system, comprising:
 applying a conveyor belt to conveyor belt sys em having an at least one central longitudinal member, an at least one side longitudinal member, each having open side construction adapted to permit access to a cleaning device and an at least two support members spaced apart from one another along the length of the conveyor belt and in direct contact and supporting the conveyor belt and between the at least one side longitudinal member and at least one central longitudinal member coupling the at least one central longitudinal member to the at least one longitudinal side member such that the at least one central longitudinal member is below the at least one side member;
 engaging a drive pulley to move conveyor belt and convey product;
 disengaging drive; and
 cleaning without removing the conveyor belt such that the at least one central longitudinal member and the at least one side longitudinal member, each having open side construction adapted to permit access to the cleaning device, permits deployment of the cleaning device with access to substantially all surfaces of the system without removal of the conveyor belt from the conveyor belt system.

* * * * *